United States Patent [19]

Maru et al.

[11] 4,365,007

[45] Dec. 21, 1982

[54] FUEL CELL WITH INTERNAL REFORMING

[75] Inventors: Hansraj C. Maru, Brookfield Center; Pinakin S. Patel, Danbury, both of Conn.

[73] Assignee: Energy Research Corporation, Danbury, Conn.

[21] Appl. No.: 272,947

[22] Filed: Jun. 12, 1981

[51] Int. Cl.³ .............................................. H01M 8/18
[52] U.S. Cl. ....................................... 429/19; 429/19; 429/34
[58] Field of Search ....................... 429/19, 16, 17, 34, 429/46

[56] References Cited

U.S. PATENT DOCUMENTS

| | | | |
|---|---|---|---|
| 3,488,226 | 1/1970 | Baker et al. | 136/86 |
| 4,019,969 | 4/1977 | Golebiowski et al. | 204/26 |
| 4,182,795 | 1/1980 | Baker et al. | 429/13 |

Primary Examiner—Charles F. LeFevour

[57] ABSTRACT

A fuel cell system provided with a first passage means in communication with and adjacent to a cell diffusion electrode and with a second passage means having a catalyst for reforming hydrocarbons and communicating with the first passage means through a gas porous member. Differential pressure means is further provided to establish a pressure differential between the passage means for promoting reformed gas flow from the second passage means to the first passage means and retarding electrolyte vapor passage from the first passage means to the second passage means.

35 Claims, 6 Drawing Figures

FUEL CELL WITH INTERNAL REFORMING

BACKGROUND OF THE INVENTION

This invention pertains to fuel cells and, in particular, to fuel cells in which there is internal reforming of the hydrocarbon content of the fuel cell supply gas.

It is known in the design of fuel cells, such as, for example, molten carbonate and phosphoric acid cells, to internally reform the hydrocarbon content of the fuel supply gas. Such hydrocarbon content usually contains methane which itself is relatively electrochemically inactive, but which when reformed produces hydrogen and carbon monoxide which are significantly more electrochemically active and, therefore, can readily participate in the fuel cell reaction. Reforming internal of the fuel cell is beneficial in that the reforming reaction is endothermic and serves to offset heat generated in the cell during operation. Accordingly, by internal reforming, the load on the fuel cell cooling system can be reduced.

U.S. Pat. No. 3,488,226 discloses an internal reforming scheme in which the reforming catalyst is situated within the anode electrode gas chamber. The hydrocarbon content of the supply fuel gas is thus reformed during its passage through the anode chamber, and, therefore, is immediately available to the cell anode upon reformation. A drawback of this arrangement, however, is that the endothermic nature of the reforming reaction results in cold spots in the anode chamber which cause condensation of electrolyte vapor transmitted to the anode chamber through the gas-diffusion anode electrode. Such condensation, in turn, may severely reduce catalytic activity and, as a result, the reforming reaction.

U.S. Pat. No. 4,182,895, assigned to the same assignee hereof, attempts to avoid electrolyte vapor condensation by providing an electrolyte-isolated chamber in which the catalyst is placed and in which the reforming reaction takes place. Fuel supply gas reformed in the electrolyte-isolated chamber is then introduced into the anode (electrolyte-communicative) chamber for electrochemical reaction. Owing to the isolation of the reforming chamber from the electrolyte, electrolyte vapor condensation on the reforming catalyst does not occur and catalyst activity is preserved. In this arrangement, reformed gas is not immediately available to the anode chamber, but must be introduced into such chamber subsequent to reformation.

It is an object of the present invention to provide a fuel cell having improved internal reforming.

It is a further object of the present invention to provide a fuel cell arrangement in which internal reforming is carried out such that the reformed gas is made substantially immediately available to the cell electrode, while at the same time avoiding electrolyte vapor condensation on the reforming catalyst.

SUMMARY OF THE INVENTION

In accordance with the principles of the present invention, the above and other objectives are realized in a fuel cell system wherein a first passage means is provided adjacent to and in communication with a cell gas-diffusion electrode and a second passage means having a catalyst for hydrocarbon reforming communicates with the first passage means through a gas-porous member. Differential pressure means is further provided to promote flow of hydrocarbons reformed in the second passage means, through the gas-porous member and into the first passage means. Reformed gas is thereby made immediately available to the first passage means and, therefore, the cell electrode for electrochemical reaction. The differential pressure means, in promoting flow from the second passage means to the first passage means, also inhibits electrolyte vapor flow in the opposite direction, thereby preventing such vapor from reducing catalyst activity through condensation.

In the embodiments of the invention to be disclosed hereinafter, the gas-porous member includes or incorporates the reforming catalyst and the differential pressure means includes constrictions selectively disposed in one or the other or both of the first or second passage means. Additionally, various catalyst-incorporating gas-porous members are disclosed.

In one form, the gas-porous member comprises a sheet or plate of solid (substantially non-gas-porous) material which is made porous by perforating and upon which is disposed a catalyst layer. In another form, the sheet or plate is made of material which is itself gas-porous and, therefore, need not be perforated. In yet a further form, the gas-porous member comprises a gas-porous matrix of a conductive metallic material into which is impregnated the catalyst material. This form of matrix is advantageous in itself, since it facilitates conductive contact with the cell electrode.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
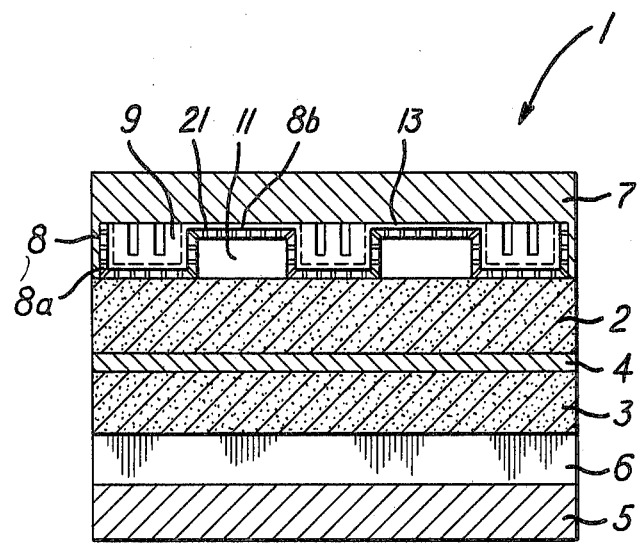
FIG. 1 shows schematically a fuel cell system in accordance with the principles of the present invention.

In FIG. 1, a fuel cell 1 comprises anode and cathode electrodes 2 and 3, of gas diffusion type, having an electrolyte matrix 4, therebetween. A separator plate 5 defines a chamber 6 for receiving cathode supply gas and delivering same to the cathode electrode 3. A further separator plate 7 in cooperation with valley regions 8a of a corrugated member 8 defines chambers or channels 9 for receiving anode supply gas having hydrocarbon content. These channels are spaced one from the other by channels 11 defined by the crest regions 8b of the member 8 and the anode electrode 2.

In accordance with the invention, the cell 1 is further adapted to reform the hydrocarbon content of the anode supply gas in channels 9 and to deliver such reformed gas to the anode electrode 2 upon being reformed and in a manner which inhibits electrolyte deactivation of the reforming catalyst. More particularly, this is realized in the fuel cell 1 by forming the member 8 as a gas-porous member incorporating a reforming catalyst and by providing means for establishing a pressure differential between the channels 9 and 11 which is positive in the direction of the channels 11 (i.e. the channels 9 are at higher pressure than the channels 11) so as to promote gas flow from the former to the latter channels.

Figure 2:
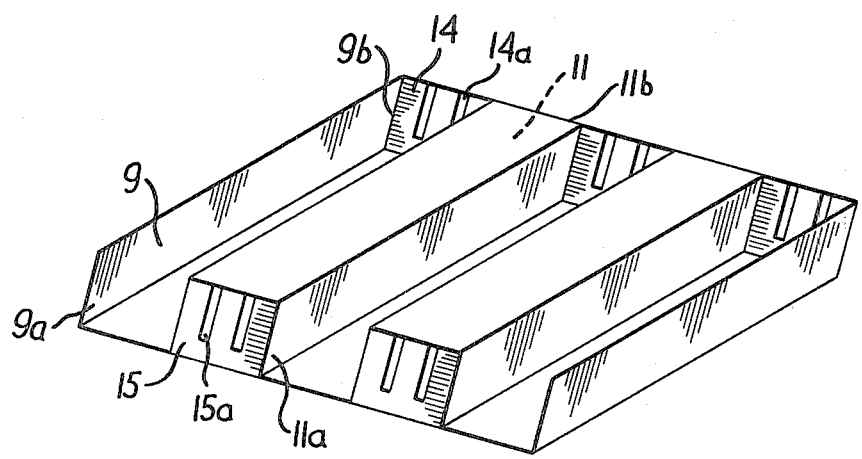
FIG. 2 shows an isometric view of the gas-porous member of the cell of FIG. 1.
Figure 3:
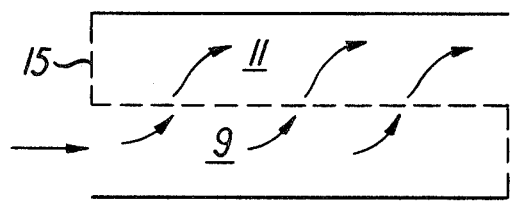
FIG. 3 illustrates schematically two adjacent channels of the gas-porous member of FIG. 2.

In FIG. 1, the gas-porous member 8 is in the form of a plate of solid material which has been made gas-porous by placing perforations 21 therein and which supports a porous catalytic layer 13 on its upper surface, i.e., on its surface bordering the channels 9. Constrictions for selectively constricting flow in the channels 9 and 11 provide the desired positive differential pressure promotive of gas flow from the channels 9 to the channels 11 through the gas-porous member 8. FIG. 2 more clearly shows constrictions in the form of walls 14 disposed at the exit ends 9b of the channels 9 to inhibit gas exit, the input ends 9a of the channels being open to permit gas entry. As shown in FIG. 2, the walls 14 have slots 14a so as to only partially constrict the respective passages 9 and thereby allow for removal of undesired reforming reaction products. Further constrictions in the form of walls 15 are disposed at the entry ends 11a of the channels 11 to retard gas entry, while the output or exit ends 11b of these channels are, in turn, open to enable exit of the reaction products of the electrochemical reaction. The constrictions 15 may also be slotted as at 15a so as to allow for partial entry of gas, if desired.

Figure 4:
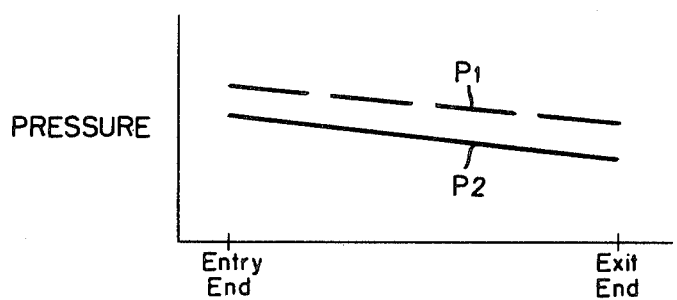
FIG. 4 shows schematically the pressure differential along the length of the adjacent channels of FIG. 3.

With the constrictions 14 and 15 properly adjusted, so as to result in a pressure profile p1, (see FIG. 4) along the length of the channels 9 which is higher than the corresponding pressure profile p2 along the length of the channels 11, as above-described, the anode supply gas introduced in the input ends 9a of the channels 9, as it passes down the channels, will have its hydrocarbon content reformed by the catalytic layer 13 (in the case of methane, hydrogen and carbon monoxide are generated) and the reformed gas will be urged to pass through the layer 13 and the perforated plate member 8 into the channels 11. Reformed gas will thus be immediately available to the anode electrode 2 via channels 11 upon being generated.

The presence of the positive pressure differential between the channels 9 and 11 also tends to retard vaporized electrolyte in the chambers 11 from further migrating into and through the plate 8 and into the chambers 9. Such vaporized electrolyte is thus substantially kept away from the catalytic layer and deactivation of same is avoided.

The perforated plate of gas-porous member 8 might typically be fabricated from a corrosion resistant material, such as, for example, stainless steel, this material then being provided with fine perforations which might, for example, be about 50–1000 $\mu$m. The catalyst layer 13, in turn, should preferably be such that only the fine pores of the member 8 are continuous and may comprise, for example, Ni, Ni-Cr, Ni-Co, Ni-Mo or suitable combinations of these materials. The use of the additive materials (Cr, Co, Mo) is advantageous where a high initial surface area and a high stability for the layer 13 is desired. The Co and Mo additives, furthermore, also may be helpful in providing $H_2S$ tolerance to performance decay, while the Co additive might additionally enable reforming at low steam-to-carbon (S/C) ratios.

In a modified construction of the porous member 8 of FIG. 1, the member is again in the form of a plate or foil, but in this case the plate material is itself porous to the reformed gas generated by the catalytic layer 13. Thus, for example, where the reformed gas is hydrogen, the plate might comprise nickel or a nickel alloy or palladium, both of which materials (nickel and palladium), allow diffusion of molecular hydrogen. The use of such gas-porous materials are further advantageous in cells wherein the electrolyte matrix 4 comprises molten carbonate as the electrolyte. In particular, these materials do not react with molten carbonate and, therefore, do not contribute to electrolyte loss.

Another modification of the porous member 8 of FIG. 1 is to further provide a thin layer of palladium on the bottom surface of the plate facing the anode electrode 2. This type of layer will act as a selective membrane to permit reformed gas diffusion through the member 8, while at the same time inhibitting diffusion of large amounts of water. As a result water will not transfer from the channels 9 to the channels 11, thereby tending to promote the reforming reaction and to avoid retarding of the electrochemical reaction.

With the fuel cell 1 of FIG. 1 constructed as above-described, the selective transport of the reformed anode gas into the channels 11 provides higher efficiency and improved current density because of the higher reformed gas partial pressures. An overall improved cell thereby results.

Figure 5:
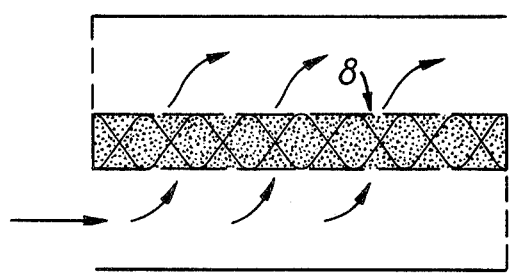
FIG. 5 shows adjacent channels of a gas-porous member in accordance with a second embodiment of the present invention.
Figure 6:
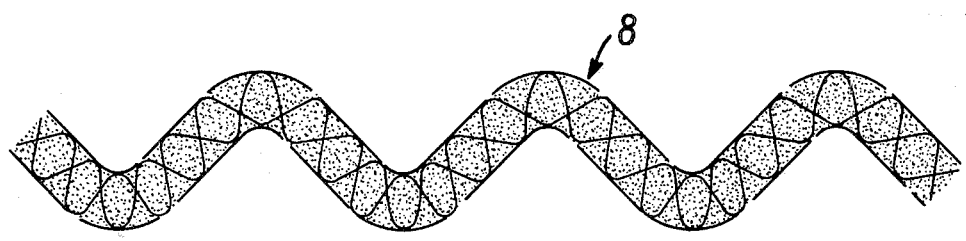
FIG. 6 illustrates a gas-porous member of the type shown in FIG. 5 shaped as a corrugated element.

FIGS. 5 and 6 show a second embodiment of a gas-porous member 8 in accordance with the present invention. In this case, the member 8 is in the form of a conductive porous metallic matrix whose pores have been impregnated and are filled with a catalyst material. Such a matrix can be corrugated as shown in FIG. 6 and used in the same manner as illustrated in FIG. 1 to define the channels 9 and 11. Alternately, this form of member 8 can be made into thick rectangular sheets which can then be supported between the plate 7 and the anode electrode 2, as schematically depicted in FIG. 5. Useable metallic materials for the matrix are nickel, palladium and other conducting stable metal alloys acceptable for the fuel cell environment.

The aforesaid conductive matrix form of the porous member 8 is further advantageous, since the conductive nature of the member promotes coupling of the electrical energy from the anode electrode through the separator plate 7 to the cell output.

It should be noted that if a more uniform distribution of gas flow into the chambers 11 along their length is desired, the porosity of the gas-porous member 8 can be tailored to provide the desired uniformity. In general, decreasing the porosity of the member adjacent the gas entry end (i.e., ends 11a and 9a in FIG. 1) relative to the gas exit end (i.e., the ends 11b and 9b in FIG. 1), will promote increased uniformity in gas flow distribution. In the particular case of the perforated plate embodiment of the member 8, this can be be accomplished, for example, by utilizing an increased number of perforations and/or perforations of increased size at the gas exit end relative to the gas entry end.

In all cases, it is understood that the above-described arrangements are merely illustrative of the many possible specific embodiments which represent applications of the present invention. Numerous and varied other arrangements can readily be devised without departing from the spirit and scope of the invention. Thus, for example, the catalyst layer 13 need not be incorporated into the porous member 8, but instead could be placed elsewhere in the channels 9 such as, for example, on the separator plate 7. Furthermore, the catalyst may be in the form of a pellet bed. Another modification would be to utilize a catalyst layer 13 on both the upper and lower surfaces of the plate member 8. Also, the anode member 2 may include additional components such as, for example, an electrolyte storage element and/or a current collector, interposed between the anode body and the member 8.

What we claim is:

1. An electrochemical cell system comprising:
    a gas diffusion electrode;
    first passage means in communication with said electrode;
    second passage means having a catalyst for reforming hydrocarbons and including a gas porous member in communication with said first passage means;
    and means for establishing a differential pressure between said first and second passage means so as to promote gas flow from said second passage means through said gas-porous member to said first passage means, whereby the hydrocarbon content of supply gas introduced into said second passage means is reformed by said catalyst and said reformed hydrocarbon content is aided by said differential pressure to pass through said gas-porous member into said first passage means to said gas-diffusion electrode for electrochemical reaction, and electrolyte vapor in said first passage means is retarded by said differential pressure from contacting and passing through said gas-porous member to said second passage means.

2. A cell in accordance with claim 1 wherein:
    said gas-porous member includes said catalyst.

3. A cell in accordance with claim 2 wherein:
    said gas-porous member comprises a perforated plate;
    and said catalyst is a layer disposed on said plate.

4. A cell in accordance with claim 3 wherein:
    said plate comprises a non gas-porous material.

5. A cell in accordance with claim 4 wherein:
    said material is stainless steel.

6. A cell in accordance with claim 3 or 4 wherein:
    said layer is on the surface of said plate facing said second passage means.

7. A cell in accordance with claim 6 further comprising:
    a further layer disposed on the surface of said plate facing said first passage means, said further layer comprising a material allowing selective passage of products of said reformed hydrocarbon content.

8. A cell in accordance with claim 7 wherein:
    said further layer comprises one of nickel and palladium.

9. A cell in accordance with claim 3 wherein:
    said layer is on the surfaces of said plate facing said first and second passage means.

10. A cell in accordance with claim 2 wherein:
    said gas-porous member comprises a plate of gas-porous material;
    and said catalyst is a layer disposed on said plate.

11. A cell in accordance with claim 3 or 10 wherein:
    said plate comprises one of nickel, nickel alloy and palladium.

12. A cell in accordance with claim 3 or 4 wherein:
    said layer is on the surface of said plate facing said second passage means.

13. A cell in accordance with claim 2, 3 or 10 wherein:
    said gas-porous member is corrugated so as to have crest regions and valley regions, said crest regions serving to partially define said first passage means and said valley regions serving to partially define said second passage means.

14. A cell in accordance with claim 13 wherein:
    said anode electrode contacts the peaks of said valley regions to further define said first passage means.

15. A cell in accordance with claim 14 further comprising:
    a separator plate disposed in contact with the peaks of said crest regions to further define said second passage means.

16. A cell in accordance with claim 2 wherein:
    said gas-porous member comprises a conductive gas-porous matrix;
    and said catalyst is contained in the pores of said matrix.

17. A cell in accordance with claim 16 wherein:
    said conductive matrix comprises one of nickel, nickel alloy and palladium material.

18. A cell in accordance with claim 1 wherein:
    said first passage means has first entry and exit ends:
    and said second passage means has second entry and exit ends, said gas-porous member being situated between said second entry and exit ends.

19. A cell in accordance with claim 18 wherein:
    said differential pressure means maintains said differential pressure over the lengths of said first and second passage means commensurate with the length of said gas-porous member.

20. A cell in accordance with claim 19 wherein:
    said gas-porous member extends from said second entry end to said second exit end.

21. A cell in accordance with claim 20 wherein:
    said first exit and entry ends are adjacent to said second exit and entry ends, respectively.

22. A cell in accordance with claim 18 wherein:
    said differential pressure means includes a first constriction means selectively disposed in one of said first and second passage means for constricting the flow therein.

23. A cell in accordance with claim 22 wherein:
    said one passage means is said second passage means;
    and said first constriction means includes a first constriction member disposed adjacent the exit end of said one passage means for selectively constricting said exit end of said one passage means.

24. A cell in accordance with claim 22 wherein:
    said one passage means is said first passage means;
    and said first constriction means includes a first constriction member disposed adjacent the entry end of said one passage means for selectively constricting said entry end of said one passage means.

25. A cell in accordance with claim 23 or 24 wherein:
    said first constriction member totally constricts the entry end of said one passage means.

26. A cell in accordance with claim 20 or 21 wherein:
    said first constriction member partially constricts said adjacent end of said one passage means.

27. A cell in accordance with claim 22 wherein:
    said differential pressure means further includes a second constriction means selectively disposed in the other of said first and second passage means for constricting the flow therein.

28. A cell in accordance with claim 1 or 2 further comprising:
    an electrolyte adjacent said gas diffusion electrode.

29. A cell in accordance with claim 28 wherein:
said gas diffusion electrode is an anode electrode.
30. A cell in accordance with claim 28 wherein:
said electrolyte is molten carbonate.
31. A cell in accordance with claim 1 wherein:
the porosity of said gas-porous member is selected to promote uniformity in the flow distribution of said reformed hydrocarbon content passing into said first passage means.
32. A cell in accordance with claim 31 wherein: said gas-porous member comprises a plate having perforations of size and distribution selected to provide flow distribution uniformity.
33. A cell in accordance with claim 1 wherein:
said catalyst comprises a catalyst pellet bed.
34. A cell in accordance with claim 1 or 2 wherein:
said gas-diffusion electrode is an anode electrode; and said supply gas is anode supply gas.
35. A cell in accordance with claim 34 wherein:
said anode supply gas includes methane.

* * * * *